July 25, 1950     A. A. HEJDUK ET AL     2,516,825
METERING VALVE
Filed Feb. 19, 1945
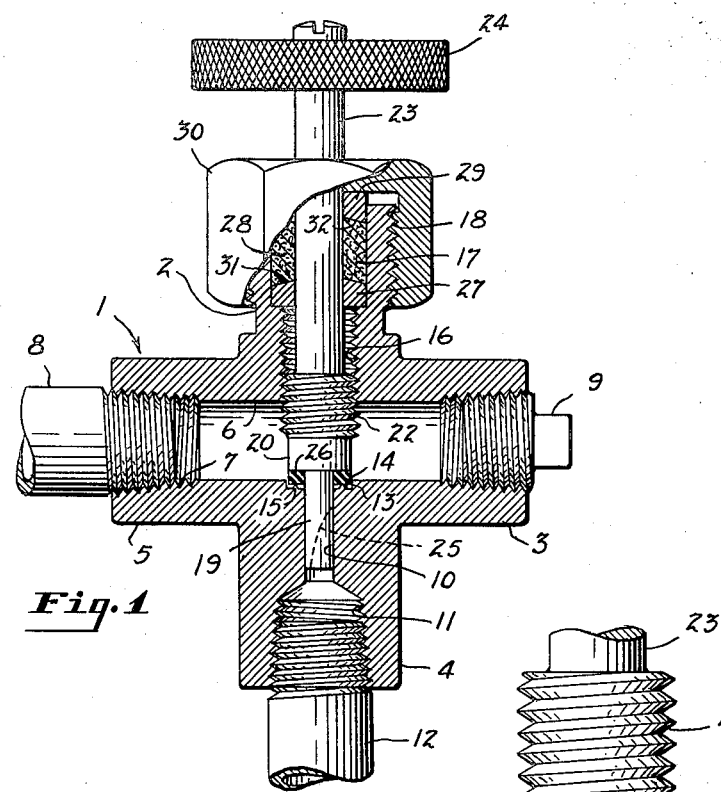
INVENTORS
Arthur A. Hejduk
Paul B. Shannon
BY Evans & McCoy
ATTORNEYS Patented July 25, 1950

2,516,825

UNITED STATES PATENT OFFICE 2,516,825

METERING VALVE

Arthur A. Hejduk, Cleveland, Ohio, and Paul B. Shannon, Chicago, Ill., assignors to The Meriam Instrument Company, Cleveland, Ohio, a corporation of Ohio Application February 19, 1945, Serial No. 578,726

2 Claims. (Cl. 251—34)

This invention relates to flow regulating or metering valves for accurately controlling the rate of flow of a fluid between chambers maintained at different pressures, or to control the rate of flow of air to or from a pressure or vacuum chamber.

The invention has for an object to provide a valve which is designed to afford a minutely accurate regulation of the rate of flow of a fluid which will provide a perfect seal against leakage of the fluid through the valve when the valve is closed.

A further object of the invention is to provide a valve of the type in which the flow regulation is obtained by adjustment of a threaded stem extending from the valve through a wall of the valve chamber and in which an effective seal is provided around the adjustable valve stem to prevent escape of fluid to the atmosphere through the opening in the valve body which receives the valve stem.

With the above and other objects in view, the invention may be said to comprise the metering valve as illustrated in the accompanying drawings hereinafter described and partially set forth in the appended claims, together with such variations and modifications thereof as will be apparent to one skilled in the art to which the invention pertains.

Reference should be had to the accompanying drawings forming a part of this specification, in which Fig. 1 is a central section through the valve;

Fig. 2 is a fragmentary sectional view showing the valve in an open position;

Fig. 3 is a fragmentary side elevation of a portion of the valve and valve stem;

Fig. 4 is a section taken on the line indicated at 4—4 in Fig. 3;

Fig. 5 is a side elevation of a modified form of valve, and

Fig. 6 is a section taken on the line indicated at 6—6 in Fig. 5.

Referring to the accompanying drawings, the valve of the present invention has a body 1 that is provided with four angularly spaced projections 2, 3, 4 and 5, the projection 2 being alined with the projection 4 and the projections 3 and 5 being alined to each other and disposed at right angles to the projections 2 and 4.

A bore 6 is provided centrally through the valve body and projections 3 and 5. At the ends thereof the bore 6 has internally threaded portions 7 which are identical and which are adapted to receive a pipe 8 and plug 9, either of the threaded portions 7 being adapted to receive either a pipe or a plug as convenience may dictate.

The projection 4 has a central bore 10 and an internally threaded counterbore 11 at its outer end which is adapted to receive a pipe 12. A counterbore 13 extends through the projection 2 and terminates in the wall of the bore 6 at the side thereof to which the bore 10 opens. The counterbore 13 provides a substantially flat annular seat 14 around the inner end of the bore 10 and the bottom of the counterbore is milled to provide a circular sealing rib 15. The portion of the counterbore 13 at the opposite side of the bore 6 has an internal thread 16 and a second counterbore 17 is formed in the outer end of the projection 2. The projection 2 is circular in cross section and has an external thread 18.

A valve 19 of cylindrical form fits closely in the bore 10 and is carried by a stem 20 of larger diameter which provides a flat annular shoulder 21 that overlies the flat annular seat 14. The stem 20 has a threaded portion 22 that engages with the thread 16 of the counterbore 13 and an outer end portion 23 of reduced diameter which extends through the counterbore 17 and has a handle 24 attached to its outer end. The valve 19 has a channel shaped groove 25 extending inwardly from its outer end, tapering inwardly and terminating outwardly of the shoulder 21 far enough to provide a solid cylindrical inner end portion for closing the bore 10 when the valve is in closed position.

In order to prevent leakage of fluid past the valve, a sealing washer 26 is mounted on the solid portion of the valve 19 against the shoulder 21 and this washer is pressed tightly against the annular sealing rib 15 when the valve is closed.

At the bottom of the counterbore 17 a bearing ring 27 is mounted. The bearing ring 27 fits within the bore 17 and upon the exterior of the portion 23 of the stem. Outwardly of the ring 27 a packing ring 28 is mounted within the counterbore 17 and at the outer end of the counterbore there is mounted a second metal ring 29 which has a sliding fit in the counterbore 17 and on the stem 23. The upper ring 29 is engaged by a gland 30 that is screwed on the thread 18 of the projection 2 so that the packing ring 28 is compressed between the rings 27 and 29. In order to provide a more effective seal, the rings 27 and 29 have opposed externally and internally conical faces 31 and 32 which serve to press opposite ends of the packing ring 28, one toward the stem 23 and the other toward the wall of the counterbore 17 so that when the gland 30 is tightened a very effective seal is provided around the stem 23.

In some instances it may be desirable to provide a valve which may be adjusted to a position in which it will permit a free flow of fluid through the bore 10, in which case a valve 19a may be provided, which has a long tapering flat face 33 which in the extreme open position of the valve will permit a substantially free flow of fluid through the bore 10.

It is to be understood that variations and modifications of the specific device herein shown and described for purposes of illustration, may be made without departing from the spirit of the invention.

What we claim is:

1. A metering valve comprising a body having a cylindrical main bore, a second bore of smaller diameter than the main bore and disposed with its axis at right angles to and intersecting the axis of the main bore and a counterbore through said main bore and forming a substantially flat annular seat around the inner end of said second bore, the portion of said counterbore opening to the main bore opposite said seat being internally threaded, said seat having a circular upstanding rib spaced radially outwardly from said second bore, a valve having an enlarged threaded stem screwed in said counterbore, an elongated flow controlling member that has a sliding fit in said second bore, said flow controlling member having an inner cylindrical portion and an outer end portion shaped to provide an elongated tapering passage along the wall of said second bore and a flat shoulder overlying the circular upstanding rib of said annular seat, and an annular sealing washer carried by the valve and fitting on said cylindrical portion, said washer being compressible between said shoulder and seat and having flat faces, one engaging said shoulder and the other engageable with said rib.

2. A metering valve comprising a valve body having a chamber, an internally threaded bore opening into said chamber, a second bore oppositely disposed and axially alined with respect to the first, a counterbore providing a substantially flat annular seat surrounding the inner end of said second bore, said seat having a circular upstanding rib spaced radially outwardly from said second bore, a valve having a threaded portion screwed in said threaded bore and an elongated flow controlling portion slidably fitting in said second bore, said flow controlling portion being shaped to provide an elongated passage along the wall of said second bore that tapers toward said valve chamber, said valve having a flat annular shoulder surrounding said flow controlling portion and overlying said circular rib, and a flat annular sealing washer fitting on said flow controlling portion of the valve and compressible between said flat shoulder and said annular rib.

ARTHUR A. HEJDUK.
PAUL B. SHANNON.

REFERENCES CITED

The following references are of record in the file of this patent:

UNITED STATES PATENTS

| Number | Name | Date |
|---|---|---|
| 665,083 | Friedmann | Jan. 1, 1901 |
| 827,521 | Felsberg | July 31, 1906 |
| 897,364 | Glauber | Sept. 1, 1908 |
| 1,088,616 | Palmer | Feb. 24, 1914 |
| 1,345,388 | Mueller | July 6, 1920 |
| 1,619,937 | Huff | Mar. 8, 1927 |
| 1,966,294 | Goslee | July 10, 1934 |
| 1,975,178 | Smith | Oct. 2, 1934 |